A. W. MEYER.
STEAM COOKER.
APPLICATION FILED FEB. 3, 1911.
1,010,940.
Patented Dec. 5, 1911.
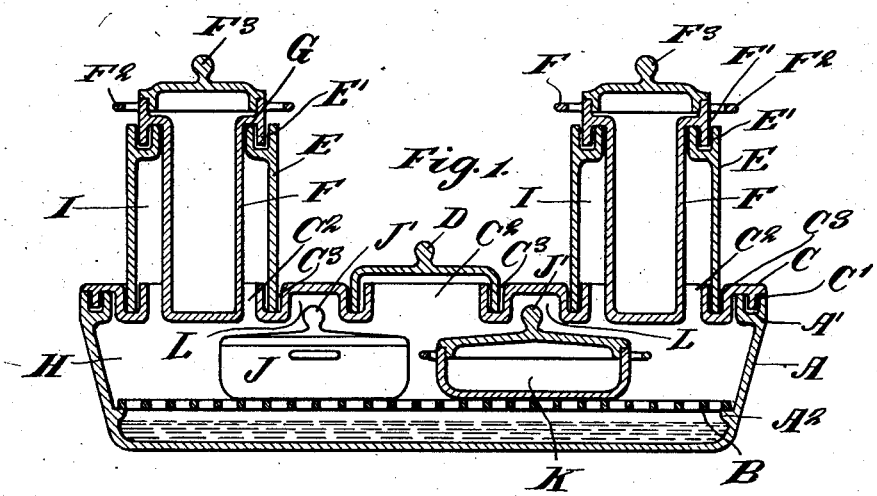
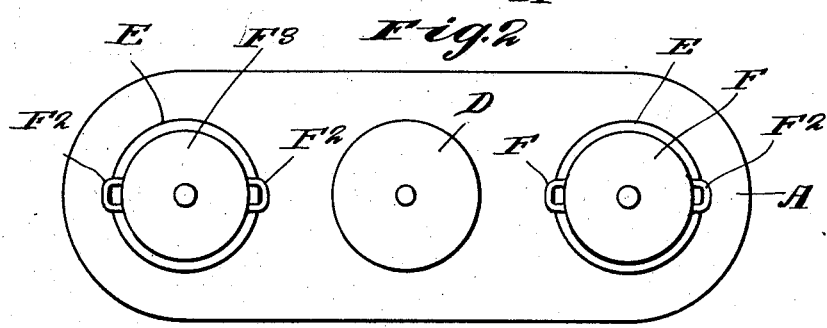
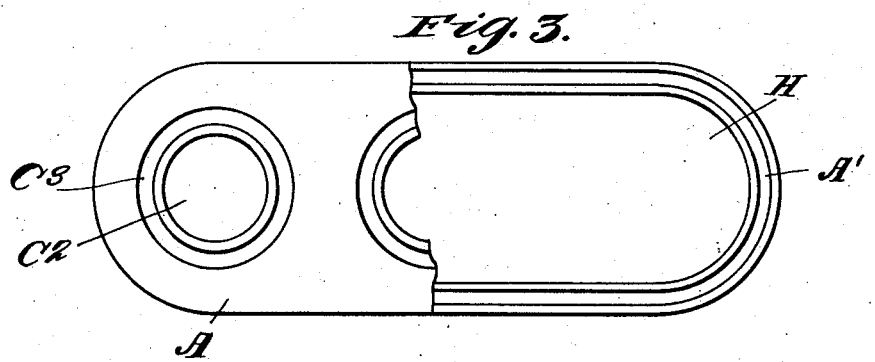
WITNESSES:
INVENTOR
Albert W. Meyer
BY
Frank A. Ashley
ATTORNEY

UNITED STATES PATENT OFFICE.

ALBERT W. MEYER, OF NEW YORK, N. Y.

STEAM-COOKER.

1,010,940. Specification of Letters Patent. Patented Dec. 5, 1911.

Application filed February 3, 1911. Serial No. 606,284.

*To all whom it may concern:*

Be it known that I, ALBERT W. MEYER, a citizen of the United States, and a resident of New York city, in the county of New York and State of New York, have invented certain new and useful Improvements in Steam-Cookers, of which the following is a specification.

My invention relates to steam cookers and the object of my invention is to provide a composite cooker in which an elongated vessel is used to contain the water which is converted into steam and to provide this vessel with a grating above the surface of the water on which may be deposited closed vessels in which meats, etc., may be cooked, and to provide a cover having openings in its top provided with water seals and arranged to hold upwardly extending casings each of which is provided with a water seal annular groove at the top into which pots having depending coöperative sealing elements can rest, said pots and casing being interchangeable.

Referring to the drawings which form a part of this specification Figure 1 is a longitudinal, sectional view through my improved steam cooker, Fig. 2 is a plan view thereof, and Fig. 3 is a plan view of the elongated vessel, the cover of which is shown broken away to disclose the projection which supports the grate above the surface of the water.

A indicates the elongated vessel which is provided at its outer, upper edge with an annular water sealing channel A' which extends entirely around the top of the vessel.

$A^2$ indicates an inwardly extending projection which extends entirely around the vessel at a predetermined height therein and supports a grating B which extends over the entire area of the bottom of the vessel. The vessel is of somewhat larger diameter at the top than at the portion where the inwardly extending projection $A^2$ is located to permit the grate to be inserted in the vessel to a point below the water seal A'.

A cover C is provided which extends the entire length and width of the vessel A and has a depending flange C' which enters the sealing channel A' to form a water seal. The cover is further provided with a plurality of openings $C^2$—$C^2$, etc., which may be covered by a cover D when the casings E and pot F are not in use and removed for any purpose, and surrounding each of said openings $C^2$ is an annular groove $C^3$—$C^3$, etc., into which the bottom edge of the casings E fit to provide a water seal at these points. Each of the casings E is provided at its top edge with an annular water sealing channel E'.

The pots F are each made with an enlarged diameter at their top and are provided at their outer circumference with a depending flange F' which enters the sealing channel E' to make a water joint, the smaller diameter of the pot F being such as to pass through the opening G in the top of the casing, the pots F being provided with a closed bottom and also serving as a closure for the openings G. The pots are further provided with handles $F^2$—$F^2$, etc., located at each side thereof and are closed by their respective covers $F^3$. The bodies of the pots F are of smaller diameters than the openings $C^2$ to permit the steam to circulate freely from the chamber H in the vessel A to the annular chambers I formed between the casings E and the pots F.

The pots J and K may be made especially for use with this steamer of comparatively large diameter and shallow depth and the knob portions J'—J' of the covers can enter the recesses L—L so that the full height of the chamber H can be utilized by the body portions of the pots J and K.

By the arrangement of the parts as above shown and described, I am enabled to use a number of the pots F at the same time and when the food which is cooked therein is sufficiently cooked, I may remove the pot and casing and by using a cover D I prevent the loss of heat due to radiation from the surfaces of the casings E which would otherwise be lost, and have also provided a very convenient form of apparatus especially adapted for use in restaurants.

Having thus described my invention what I claim is:

1. A steam cooker comprising a vessel having a grate located therein adjacent the bottom thereof and provided at its top edge with an annular channel; a cover for said vessel having a depending flange adapted to enter said annular channel in the vessel to form a water seal, and provided with a plurality of openings which extend in alinement with each other and having an annular groove formed around each of said openings; a casing the lower edge of which rests in said annular groove to form a water seal and the upper end of which is provided with an annular channel; a pot the top of which is of greater diameter than the body portion and provided with a depending flange which enters into said annular groove in said casing to form a water seal; and a cover for said pot.

2. A steam cooker comprising a vessel having a grate located therein adjacent the bottom thereof and provided at its top edge with an annular channel; a cover for said vessel having a depending flange adapted to enter said annular channel in the vessel to form a water seal, and provided with a plurality of openings which extend in alinement with each other and having an annular groove formed around each of said openings; a casing the lower edge of which rests in said annular groove to form a water seal and the upper end of which is provided with an annular groove; a plurality of pots, the tops of which are of greater diameter than the body portions and each provided with a depending flange which enters into one of said annular channels in said casing to form a water seal, said pots extending downwardly approximately to the lower end of said casing; and a cover for each of said pots.

3. A steam cooker comprising an elongated vessel substantially as shown having a grate located therein adjacent the bottom thereof and provided at its top edge with an annular channel; a cover for said vessel having a depending flange adapted to enter said annular channel in the vessel to form a water seal, and provided with a plurality of openings which extend in alinement with each other and having an annular groove formed around each of said openings; a plurality of casings the lower edges of each of which fit said annular grooves in said cover; a pot, the top of which is of greater diameter than the body portion and provided with a depending flange which enters into said annular channel in said casing to form a water seal; and a cover for said pot.

4. A steam cooker comprising an elongated vessel substantially as shown having a grate located therein adjacent the bottom thereof and provided at its top edge with an annular channel; a cover for said vessel having a depending flange adapted to enter said annular channel in the vessel to form a water seal, and provided with a plurality of openings which extend in alinement with each other and having an annular groove formed around each of said openings; a casing the lower edge of which rests in said annular groove to form a water seal and the upper end of which is provided with an annular channel; a plurality of pots, the tops of which are of greater diameter than the body portions and each provided with a depending flange which enters into said annular channel in said casing to form a water seal, said pots extending downwardly approximately to the lower end of said casing; and a cover for each of said pots.

5. A steam cooker comprising a vessel provided at its top edge with an annular channel; a cover for said vessel having a depending flange adapted to enter said annular channel in the vessel to form a water seal, and provided with a plurality of openings which extend in alinement with each other and having an annular groove formed around each of said openings; a casing the lower edge of which rests in said annular groove to form a water seal and the upper end of which is provided with an annular groove; a plurality of pots, the tops of which are of greater diameter than the body portions and each provided with a depending flange which enters into one of said annular channels in said casing to form a water seal, said pots extending downwardly approximately to the lower end of said casing; and a cover for each of said pots.

Signed at New York city, in the county of New York and State of New York this 28th day of January A. D. 1911.

ALBERT W. MEYER.

Witnesses:
 FRANK M. ASHLEY,
 MORRIS BLAU.